US008427005B1

(12) United States Patent
Kisner et al.

(10) Patent No.: US 8,427,005 B1
(45) Date of Patent: Apr. 23, 2013

(54) GENERATOR POWER MODULE

(75) Inventors: Brian Kisner, Cary, NC (US); Christopher Ellis, Youngsville, NC (US); John R. Saunders, Ocala, FL (US)

(73) Assignee: PowerSecure, Inc., Greensboro, NC (US)

( * ) Notice: Subject to any disclaimer, the term of this patent is extended or adjusted under 35 U.S.C. 154(b) by 336 days.

(21) Appl. No.: 12/855,863

(22) Filed: Aug. 13, 2010

Related U.S. Application Data

(60) Provisional application No. 61/233,651, filed on Aug. 13, 2009.

(51) Int. Cl.
*H02J 1/10* (2006.01)
(52) U.S. Cl.
USPC .............................................. 307/18; 307/57
(58) Field of Classification Search .................... 307/18, 307/57
See application file for complete search history.

(56) References Cited

U.S. PATENT DOCUMENTS

| | | | | |
|---|---|---|---|---|
| 6,877,581 | B2 | 4/2005 | Badr et al. ..................... | 180/311 |
| 7,072,195 | B2 | 7/2006 | Xu .................................. | 363/95 |
| 2003/0102716 | A1* | 6/2003 | Schultz ........................... | 307/19 |
| 2004/0084965 | A1* | 5/2004 | Welches et al. ................. | 307/64 |
| 2007/0152126 | A1* | 7/2007 | Graham et al. ............... | 248/678 |
| 2010/0302744 | A1* | 12/2010 | Englert et al. ................ | 361/730 |

OTHER PUBLICATIONS

Generac Power Systems, Inc., Generac Power Systems Product Paper, 12 pgs; printed 2003, revised 2004.
Generac Power Systems, Inc. On the Job, Modular Protection Around the Clock; 2 pgs; printed 2003, revised 2005.
Generac Power Systems, Inc. The Superior Solution for Standby Power, 4 pgs, printed 2003, revised 2005.
Generac Power Systems, Inc. Technical Perspective, 4 pgs; printed 2003, revised 2006.

* cited by examiner

*Primary Examiner* — Robert L. DeBeradinis
(74) *Attorney, Agent, or Firm* — MacCord Mason PLLC

(57) ABSTRACT

A device and method for a generator power module. The power module includes an end generator module and an interior generator module that together form a substantial enclosure. The power module may also include a switchgear module. A base may support the modules and may supply common fuel to each of the generators. The enclosure may include a control system to coordinate the generators as a unit in parallel to a utility grid and to control each generator's power output in response to a power load demand. In other embodiments, the enclosure includes a series of drawer air intake louvers to move air into the enclosure. A method of operating the power module includes activating the generators and controlling the control system to individually operate a generator in the block of generators in response to a power load demand.

20 Claims, 13 Drawing Sheets

GENERATOR POWER MODULE

This application claims the benefit of provisional application No. 61/233,651, filed Aug. 13, 2009.

FIELD OF THE TECHNOLOGY

The present disclosure relates generally to power supply, and more particularly to an improved multiple generator module, typically coordinated together as a unit and paralleled to a utility grid for back-up power generation in case of an electrical utility power failure and for utility peak power needs during grid power shortages, grid low voltage issues and grid reactive power needs.

BACKGROUND

Power production from a generator through the conversion of mechanical energy to electrical energy is well known and well utilized to meet a variety of power load demands. The adaptability and minimalistic infrastructure features of generators are particularly beneficial for both commercial and residential power supply. Conventionally, an engine-generator is mounted into a self-contained housing and installed and transported to a point of use. Often, these single generators are sized to handle a desired full power load, but if a larger power load is required, multiple generators are necessary.

Running multiple redundant large and inefficient generators, particularly in spatially-confined areas, present efficiency limitations, safety concerns and/or unwanted questionable performance during an individual generator failure event. For example, transporting and packaging large generators present shipping and installation concerns. Often, the total generator packages are too large or too heavy to ship via truck. Similarly, the footprint required for multiple oversized generators add design and installation concerns, especially for high power-demand users.

Another problematic aspect of the use of redundant, bulky generators is the inefficient fuel demand. Currently, there is considerable expense and unnecessary fuel consumption required to operate redundant generators. Furthermore, operating multiple large engines produce considerable toxic fumes, including nitrogen dioxide and/or sulfur dioxide. This by-product of on-site energy production is limited by a federally mandate and thus presents both safety and design concerns. For example, Tier 4 requirements require that a 1.2 MW generator emit less than 3.5 g/kW-hour of nitrogen dioxide. In yet another problematic aspect of the use of redundant generators is the performance concerns during shut-down events.

Another problem associated with conventional back-up and utility grid support generators is the noise they produce when operating.

SUMMARY

The present disclosure fulfills one or more of these needs in the art by providing a generator power module. This disclosure provides an improved power generation system that is convenient for shipping and installation, and is efficient, for both fuel consumption and performance, while being safe to operate. This disclosure also provides an improved method of power production to achieve a predetermined power capacity package.

The power module includes a base, an end generator module, an interior generator module, and a switchgear module. Typically, the end generator module, the interior generator module and the switchgear module are affixed on the base to form a substantially modular enclosure. In particular embodiments, the substantially modular enclosure is configured so that at a subsequent time, an additional generator module can be ganged to the modular enclosure and affixed to the base.

The base may enclose a fuel tank and have fuel tank fittings. The end generator module includes a generator and a top, side and end panel. In another embodiment, the base includes a cable tray.

In some embodiments, the end generator module may be affixed, for example with fasteners, to the base while being in fluid communication with the fuel tank fittings. Similarly, the interior generator module includes a generator and a top and a side panel configured to form at least a partial enclosure around the generator. The interior generator module is configured to be affixed to the base in communication with the fuel tank fittings and may be ganged to the end generator module.

The switchgear module is configured to be affixed to the base and ganged to at least one of the generator modules. The switchgear module may include a control system in communication with each of the generator modules. Typically, the control system coordinates the generators as a unit and controls the loading of each of the generators in response to a power load demand.

In another embodiment of the disclosure, a power module includes a base enclosing a fuel tank and having fuel tank fittings. An end generator module may include a generator and a top, side and end panel that is configured to form at least a partial enclosure around the generator. The end generator module may also have a bolted end plate. Similarly, an interior generator module includes a generator and a top and a side panel is configured to form at least a partial enclosure around the generator and to be ganged to the end generator module. A switchgear module is configured to be affixed to the base and ganged to at least one of the generator module. The end generator module, the interior generator module and the switchgear module may be affixed on the base to form a substantially modular enclosure. Further, at least one of the generator modules may include a series of drawer air intake louvers. Typically, the drawer air intake louvers are mounted to at least one panel of the generator modules to force air along the series of drawers as air moves into the module. Further, at least one of the generator modules may include a discharge plenum.

In other embodiments, the end generator module includes an end module framing and the interior generator module includes an interior module framing. The end module framing and the interior module framing may be configured to align adjacent to one another on the base. A framing fastener may be used to fasten together the end generator module and the interior generator module.

In yet further embodiments, the switchgear module may include a control system in communication with each of the generator modules to coordinate the generators as a unit. The switchgear module may include a draw out circuit breaker. The control system may include a microprocessor to coordinate the generators in parallel to a utility grid. In particular embodiments, during a generator failure event when one of the generators fails, the control system provides a continuous power output from the remaining generators. Similarly, when one of the generators is bypassed, the control system may provide a continuous power output from the remaining generators.

The control system may also furnish volt-amperes reactives (VARs) into the utility grid when a grid node reaches a voltage sag level. Further, the control system may synchronize the generators to provide power within 60 seconds after a power failure event or power demand change.

Another aspect of the present disclosure is to provide a power module that includes a block of generators substantially enclosed in an enclosure. Each of the generators is electrically in parallel with one-another. The block of generators includes a control system to control each generator's power output in response to a power load demand. The block of generators may be paralleled with the utility grid when the generators are being used to support the utility power grid. Typically, the enclosure includes a series of drawer air intake louvers.

Another aspect of the present disclosure is to provide a method of operating a block of generators, such as one described above, for the production of power. The method of operating a power module having a block of generators housed as a unit and electrically connected in parallel with a utility grid may include activating the block of generators and controlling a control system. Typically, controlling the control system includes individually operating a generator in the block of generators in response to a power load demand.

In another embodiment, the method includes controlling the control system to synchronize the block of generators together as a unit. Further, controlling the control system may include synchronizing the block of generators to the utility grid. In another embodiment, the method includes controlling the control system to individually bypass a generator in the block of generators in response to a power load demand.

The above summary was intended to summarize certain embodiments of the present disclosure. Embodiments will be set forth in the more detail in the figures and detailed description below. It will be apparent, however, that the detailed description is not intended to limit the present invention, the scope of which should be properly determined by the appended claims.

BRIEF DESCRIPTION OF THE DRAWINGS

Embodiments of the disclosure will be better understood by a reading of the Detailed Description along with a review of the drawings, in which:

FIG. 1b is a rear perspective view of the embodiment of FIG. 1a;

FIG. 4a is a front elevation view of the embodiment of FIG. 1a;

FIG. 4b is a top plan view of the embodiment of FIG. 1a;

FIG. 4c is a side elevation view of the embodiment of FIG. 1a.

FIG. 5c is a side view of the bottoms of the generator modules in final alignment as shown in FIG. 5a;

FIG. 6b is a front perspective view of the interior framing as shown in FIG. 6a;

FIG. 7b is a front perspective view of the drawout breaker of the switchgear as shown in FIG. 7a.

DESCRIPTION OF EMBODIMENTS

Figure 1A:
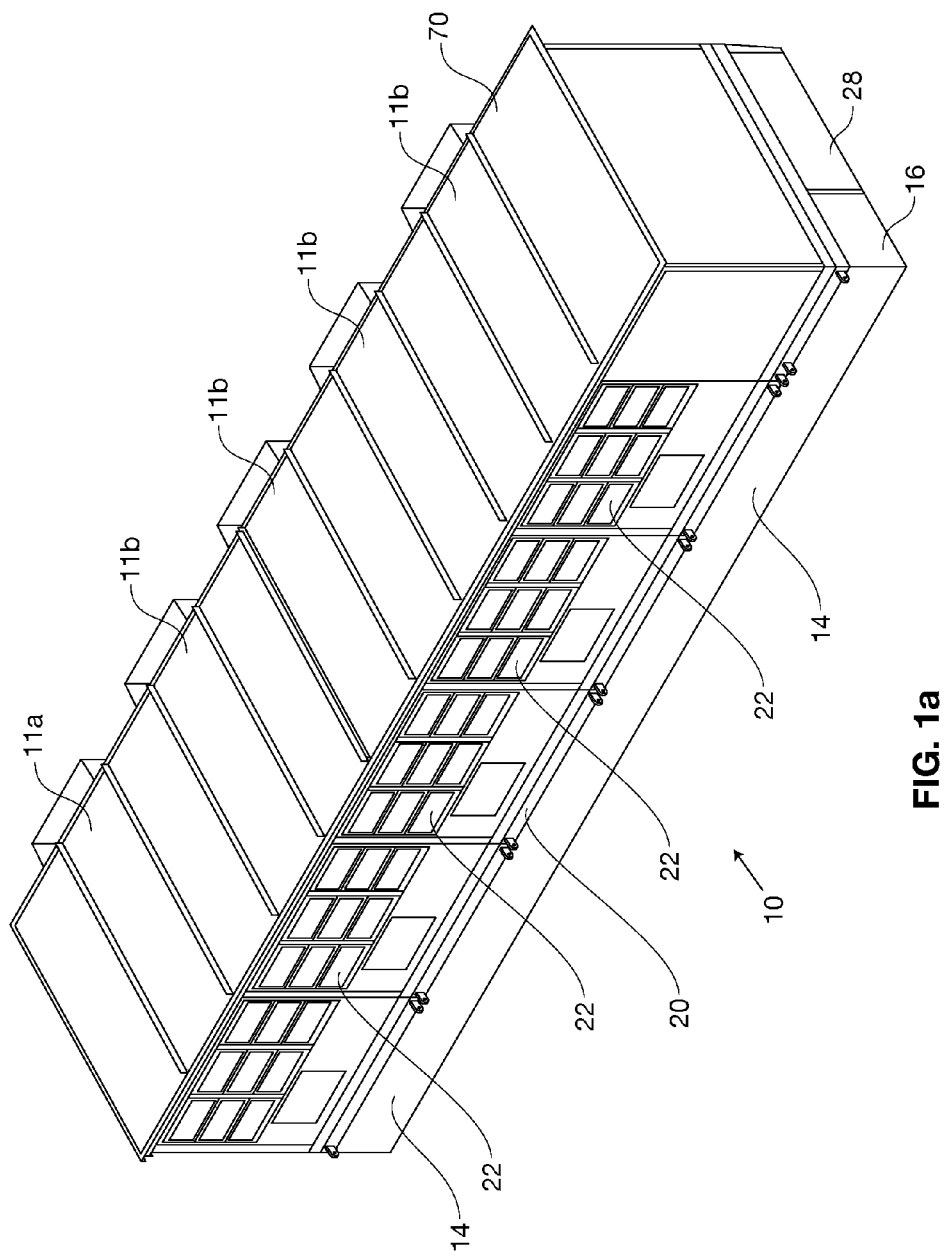
FIG. 1a is a front perspective view of an embodiment where the power module is shown conveying drawer air intake louvers.
Figure 1B:
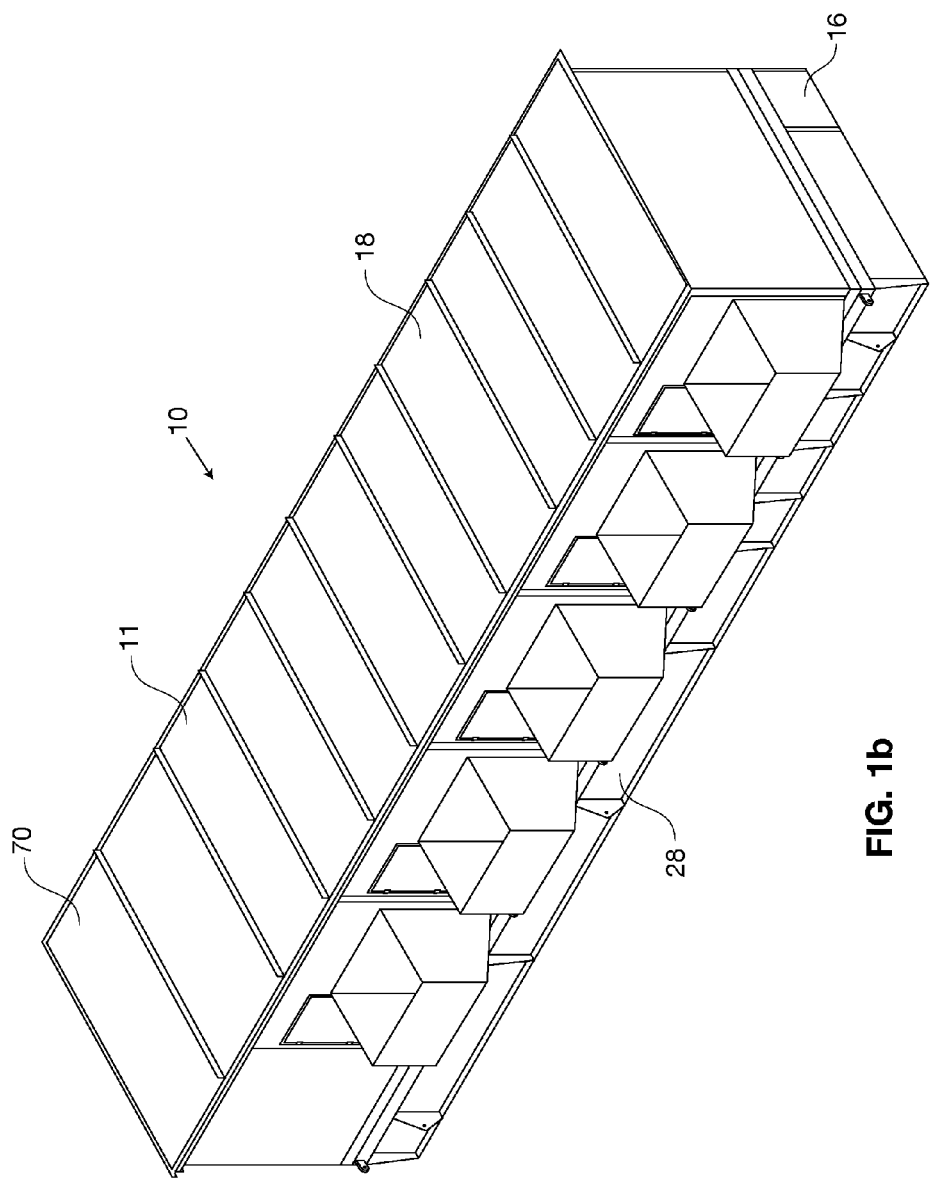
Figure 2:
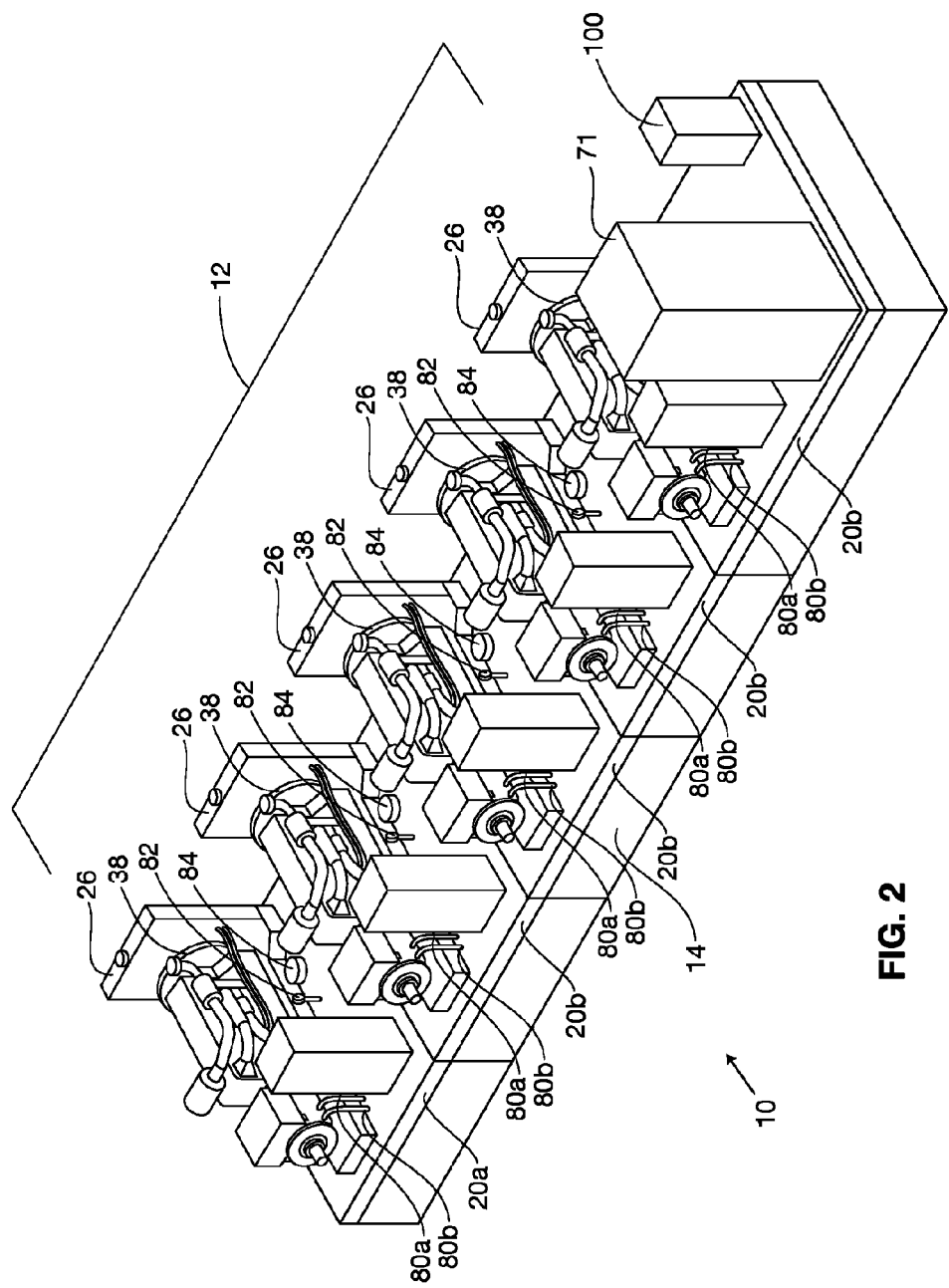
FIG. 2 is a front perspective view of the embodiment of FIG. 1a where the enclosure is removed to expose the block of generators and a fuel source.

Referring now to the drawings in general and FIGS. 1a and 2 in particular, it will be understood that the illustrations are for the purpose of describing a preferred embodiment of the disclosure and are not intended to limit the disclosure or any invention thereto. As best seen in FIG. 1a, an assembly 10 of power modules 11 is shown embodied according to the present disclosure. Each assembly 10 includes an interior generator module 11b and an end generator module 11a. As shown in FIG. 2, each generator module includes a generator 26 and is generally supported by a common base frame 14. The generator modules are positioned together to form a substantially modular enclosure 18. Further, the substantial enclosure 18 includes a switchgear module 70 which houses a transformer 100 and switchgear 71 often used to coordinate the generators 26 as a unit and to control the loading of each of the generators 26 in response to a power load demand. Typically, the interior generator modules 11b, end generator module 11a and switchgear module 70 are ganged together in a variety of orientations to form the substantial enclosure 18.

As seen in FIG. 1a, the base frame 14 typically includes a fuel tank 16 and cable tray 28 placed side-by-side, wherein each portion has an area to support multiple power modules 11. The base 14 may include ports to the fuel tank 16. Typically, the fuel tank 16 operates as the common fuel source for each of the generator modules by supplying fuel to each generator 26 through the base 14. As illustrated in FIG. 2, each generator module may include a fuel supply line 80a and fuel return line 80b in fluid communication with the fuel tank 16. The common fuel tank 16 reduces cost and improves reliability by minimizing incidents where fuel is supplied to particular generators while other generators have surplus fuel left in their tanks. Further, the common fuel tank 16 minimizes, or eliminates, fuel pumps and leveling systems. The fuel lines may further include a fuel gauge 82 and/or a fuel spillover bucket 84. If at a subsequent time, an additional generator module is ganged to the modular enclosure 18, the additional generator module's fuel tank may be connected to the common fuel tank 16, so that fuel may be shared between the new module fuel tank and the main fuel tank 16.

Further, the base frame 14 houses the cable tray 28 which typically provides support and protection for the conductors and electrical connections running between the modules and/or between a utility grid, a building, structure and the like. The cable tray 28 may be accessible through the base 14, i.e. through the bottom of each generator module and switchgear module 70. Similarly, the cable tray 28 may include exterior cover plates that are hinged, or otherwise releasablly mounted to the base, to allow installation and maintenance access to the electrical connections and cable wiring.

Typically, the base frame 14 provides support for multiple power modules to operate under a single housing that acts as a single functioning unit. Further, the common base frame 14 encourages efficient installation and use of space by minimizing the necessary footprint for the assembly 10. For illustrative purposes only, a frame 14 used to support a large modular enclosure 18 housing many generators 26 and may improve the aesthetics of the power module 10, particularly when compared to a traditional installation that would require a field of many individual small generators.

As shown in FIG. 1a, assembly 10 is modular to allow generators 26 housed in the generator modules to be added/removed as building blocks to facilitate a changing load demand. For example, a new end generator module 11b can be added to an existing base 14 and be integrated into the block of generators 12 to increase the supply relief to an electric grid at high grid power usages, improve the supply of backup power of the site or the like. For illustrative purposes only, a 1.8 MW capacity assembly 10 (paralleling 3-600 kW generators) can be expanded to add a fourth 600 kW to achieve 2.4 MW power load ability. As another example, a 3.6 MW capacity (paralleling 6-600 kW generators) will have the ability to add a $7^{th}$ 600 kW to achieve 4.2 MW power load ability. Such a modular system allows on-site generation capacities to be increased and/or decreased as site loads migrate with time without the installation and cost of adding or removing larger generators. Further, the modularity of the assembly 10 reduces many problems associated with large generator shipping and installation, i.e. packaging and transport of large, heaving components. Instead, assembly 10 is designed with a particular number of generators 26 sized to meet the site load demand. To subsequently adjust the power output from the assembly in response to any changes in site demand, a generator module is subsequently added or removed from the assembly 10.

Each assembly 10 includes one end generator module 11a which is ganged, or otherwise affixed or attached, to an interior generator module 11b. Typically, the interior generator 11b may then be ganged to a plurality of other interior generator modules 11b in series. The interior generator 11b at the end of the series is then generally ganged to the switchgear module 70.

Figure 5A:
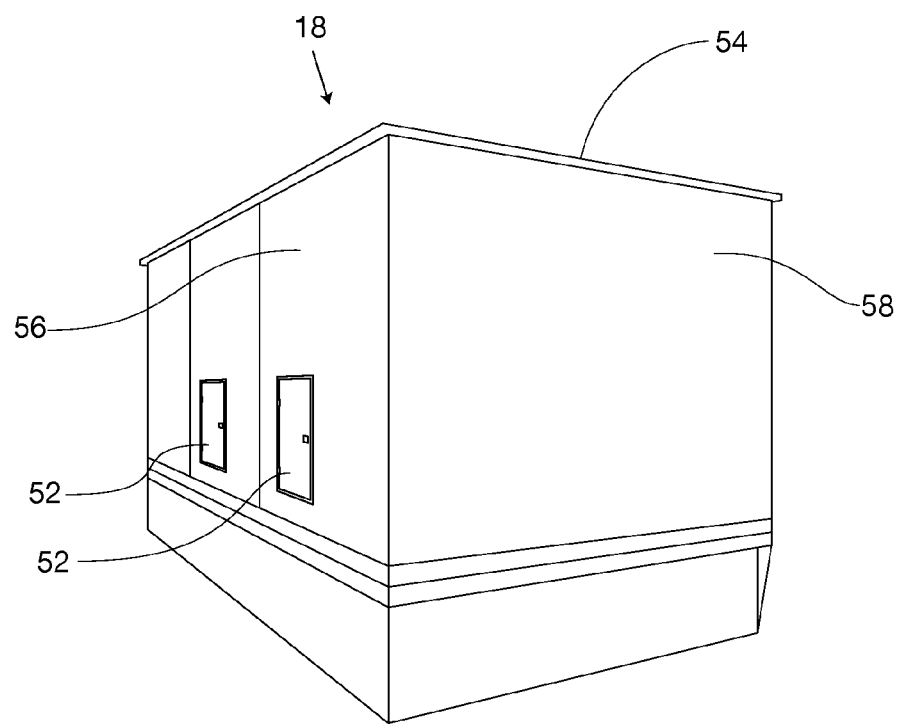
FIG. 5a is a side view of the embodiment similar to FIG. 1a with two generator modules.

As illustrated in FIGS. 1a and 5a, the interior generator modules 11b include a top external panel 54 and a side external panel 56. Together with the adjacent modules, these panels enclose the generators 26. For example, the panels in combination with the end generator module 11a on one side of the generator and the switchgear module 70 on the other side of the generator, provide at least a partial enclosure around each generator 26. Similarly, the end generator module 11b includes a top 54, side 56 and end panel 58 that are configured to form at least a partial enclosure around the generator 26 when ganged together with the interior generator module 11b. As shown in FIG. 5a, these panels may further include access panels 52 to provide installation and maintenance access. Typically, the panels and modules fully enclose all faces of the enclosure 18, i.e. the front, rear, side, and top. Therefore, combining the multiple generators 26 into a single enclosure unit permits the use of an isolated selective catalytic converter for emission reduction. In particular embodiments, all the generators are exhausted to a single catalytic converter, which lowers the cost of emissions controls, reduces emissions and presents a more aesthetically-pleasing appearance. However, enclosure 18 may also include gaps and windows, both rigid or moveable, i.e. pivotable, for specific on-site installation and/or to meet other environmental or design hindrances.

Figure 5B:
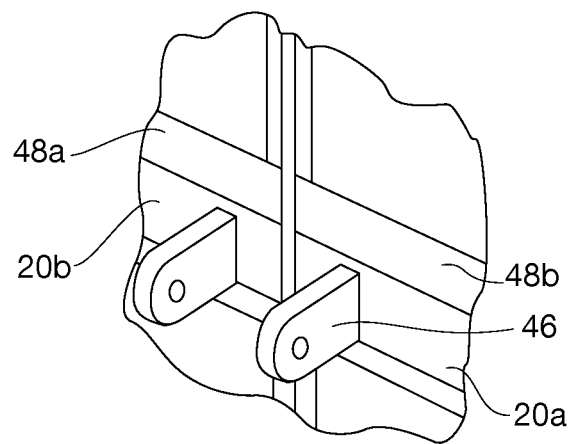
FIG. 5b is a side view of the bottoms of the generator modules prior to final alignment.
Figure 5C:
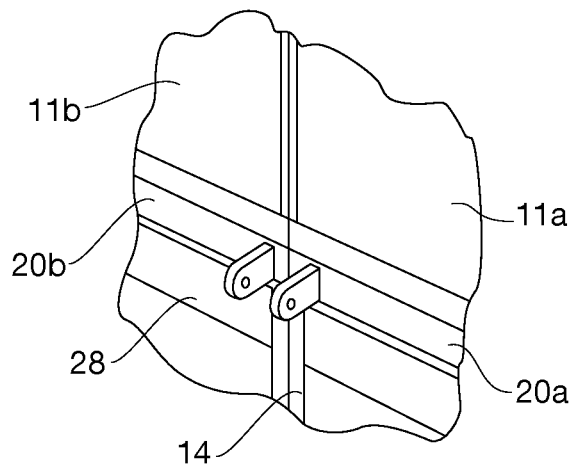

FIG. 5c shows the bottom 20a of an end generator module 11a and the bottom 20b of an interior generator module aligned adjacent to one another on the base 14. In particular embodiments, the end generator module 11a is positioned on one end of the base 14 in alignment with the fuel tank 16 on base 14. Similarly, the interior generator module 11b is also positioned on the base 14 in alignment with the fuel tank 16 and spaced adjacent to the end generator module 11a. As shown in FIG. 5b, each generator module may include a lifting point, such as lifting eye 46, for lifting and positioning on base 14. In one particular embodiment, a lifting device, such as a crane or the like, is used to support the weight of the generator module while bar clamps and ratchet straps, or the like, on lifting eyes 46 of each of the modules are used to pull the bottoms 20a and 20b snugly together. As illustrated in FIG. 5b, each module may include a series of tongues 48a and grooves 48b. In this particular embodiment, the tongue 48a on one module will align with the groove 48b on the other module to properly pull together and form the enclosure 18 shown in FIG. 5a and 5c.

Figure 6A:
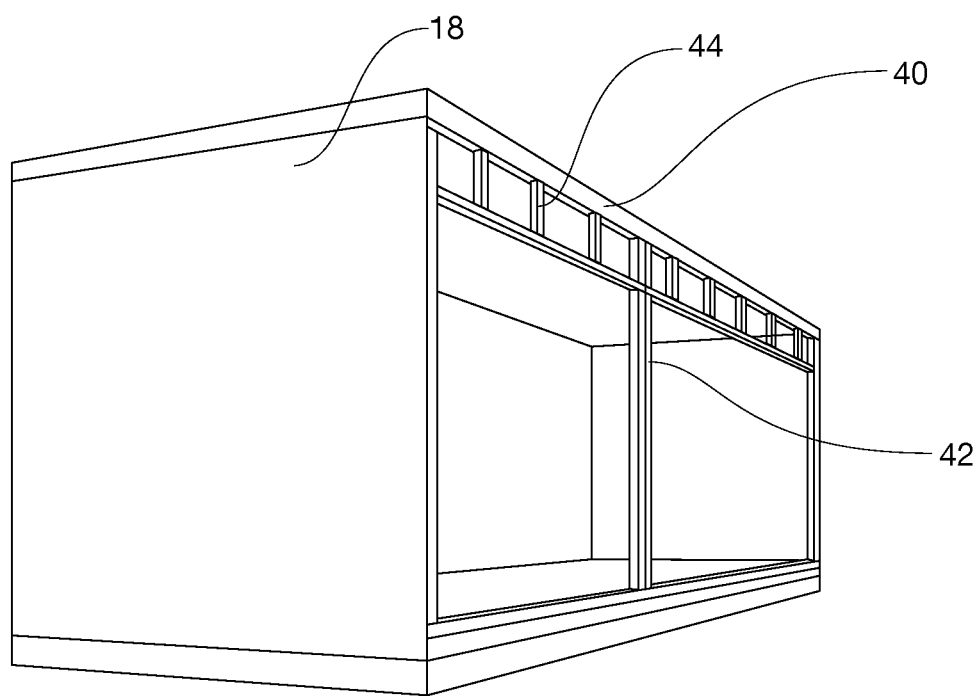
FIG. 6a is a side perspective view of the substantial enclosure where the panel elements are removed to illustrate the interior framing of one embodiment of the power module.
Figure 6B:
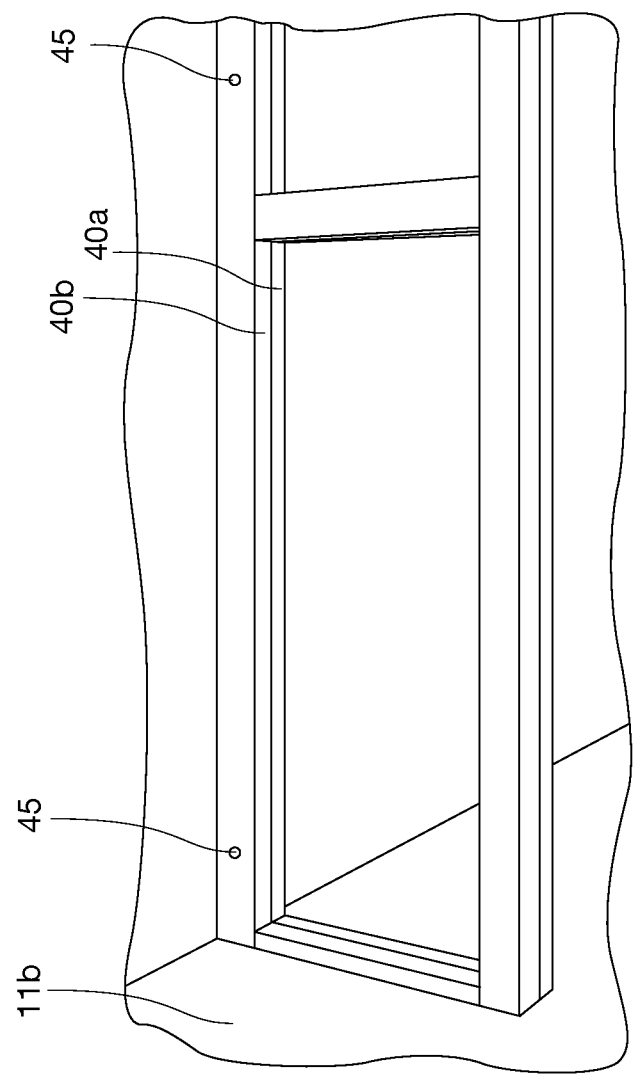

Each generator module may include interior framing 40 as illustrated in FIG. 6a. Here, the interior framing 40 may include joist elements 44 supported by upright standards 42. As shown in FIG. 6b, the end generator module 11a includes end framing 40a and the interior generator module 11b includes interior framing 40b. Once the modules are positioned adjacent to one another, a framing fastener 45, such as bolts or the like, are used to fasten together the generator modules. Similarly, a switchgear interior framing unit may also be positioned snugly to the interior framing 40b and subsequently secured with a framing fastener 45. Other embodiments include positioning and affixing the switchgear 71 within or adjacent to the interior generator module 11b in a variety of configurations and orientations.

The block of generators 12 may include a variety of generators 26 in parallel, as seen in FIG. 2. Each generator 26 may also include a fan 38. The parallel arrangement may be a single circuit, or each generator 26 can be connected for specific load, or fed through a patch board or similar select loads to be powered. Typically, the generators 26 are similarly-sized with comparable performance characteristics; however, other embodiments include generators 26 with dissimilar load capacities. One embodiment includes a 600 kW engine, but other embodiments include other engine sizes.

Figure 7A:
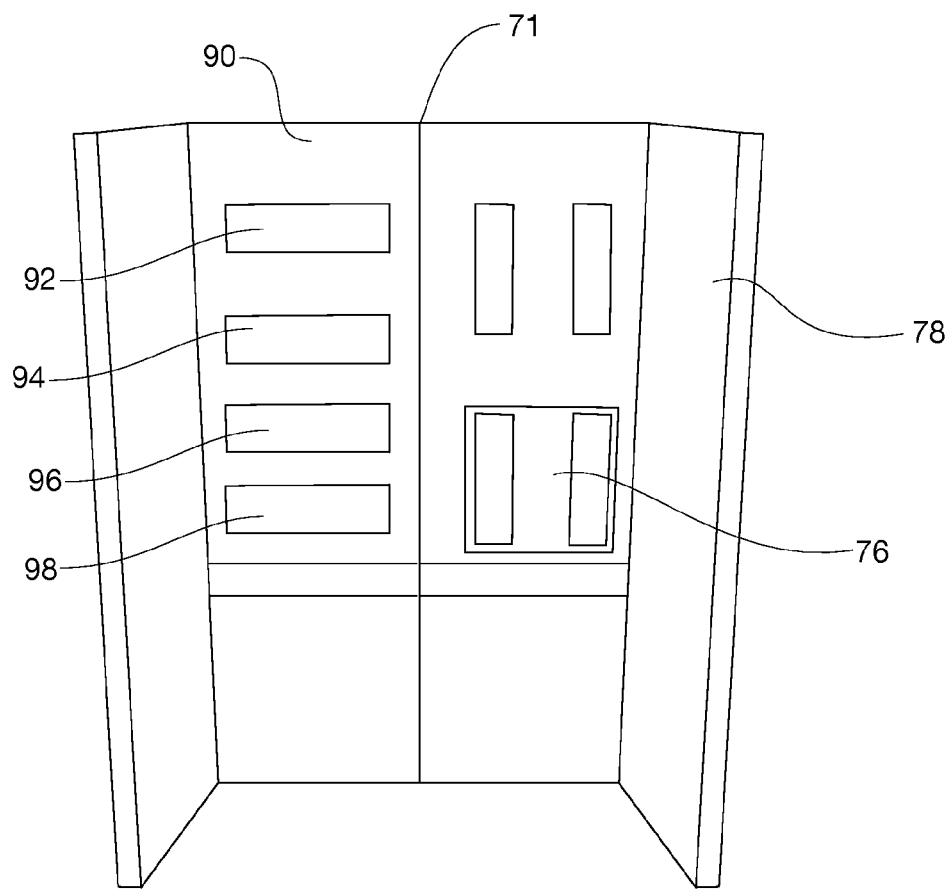
FIG. 7a is a front perspective view of the controller and switchgear housed in the switchgear module of one embodiment of the power module.

FIG. 7a illustrates one embodiment of the switchgear 71 housed in the switchgear module 70. As shown, the switchgear 71 may include a microprocessor controller 90 to operate multiple paralleling of the generators 26, a drawout circuit breaker 76, and closeable front panel doors 78. Generally, controller 90 is in electrical communication with the generator modules and controls the output and load scheme of each of the generator 26. For example, the controller 90 may control each generator's 26 power output in response to either a predetermined or failure event power load demand. Further, one embodiment of controller 90 includes an inherently built-in safety feature: if one generator 26 fails, or is otherwise bypassed, the remaining generators 26 will continue to operate. For example purposes only, a 2.4 MW (paralleling four 600 kW generators) that loses one engine will still have the ability to produce 1.8 MW with the three remaining generators 26.

In particular embodiments, the controller 90 provides control and protection for a prime mover by allowing full control of a starter and fuel from the fuel tank 16 throughout various applications. Further, in the event one of the engine-generators 26 is set up for control over the J1939 Canbus protocol, such as the protocols detailed at www.canbus.us, www.cancia.org/pg/j1939/additional/about j1939.html or similar protocols, the microprocessor controller 90 may be able to not only send commands to the engine-generators 26 for starting, stopping and throttle control, but is also able to receive data back from the engine-generators 26 and display the information on display 98 for the user. Programmable inputs in the generator control compartment 94 also provide protection from engine-generators 26 failures by allowing the user to monitor an analog and/or digital signal generated by controller 90. The control compartment 94 may also be used to optimize the generator output and controlling the paralleling of the generators 26 with the utility grid.

In particular embodiments, the switchgear 71 and controller 90 are used to parallel the assembly 10 with a utility grid by synchronizing a generator signal to the bus and synchronizing a mains signal to the bus. The paralleling operation may provide protection, metering, control and switching elements in the master control compartment 92, the generator control compartment 94 and/or the utility control compartment 96 to manage load scheme(s) of the block of generators 12 for parallel integration with the utility grid. For example, the controller 90 and parallel switchgear 71 may match the frequency, voltage, phase angle and phase rotation of each generator module the block of generators 12.

The controller 90 may meet, or exceed, the IEEE 1547 Specification interconnect requirements. In this particular embodiment, the microprocessor controller 90 initiates a generator start command from a utility, or central control command, to start and synchronize the generators 26 together. Further, the controller may synchronize the block of generators 12 to the utility grid. In some embodiments the controller 90 can have all generators up to full power in less than 60 seconds, for example ten to thirty seconds, from the time of the command. Such a capability is particularly helpful in utility grids under stress to quickly and efficiently respond to a power failure event or power demand change. Further, the power module 10 may create power with the generators and feed the power directly into the utility grid.

In particular embodiments, the user may adjust the acceptable phase window and voltage delta necessary for control of a particular application. For illustrative purposes only, the controller 90 may incorporate phase matching or slip frequency techniques during the synchronization of the generator signal and/or the mains signal. Further, the controller 90 may incorporate dead bus paralleling and full breaker/contactor control. In some embodiments, the drawout breaker 76 may include a generator breaker used to tie the generator bus to the utility bus. The drawout breaker 76 may also include a utility breaker that connects the assembly 10 to the utility grid. A main breaker may be used to tie the generator bus to the utility bus. In some embodiments, the drawout breaker may further include a distribution breaker to directly feed loads and transfer switches for parallel operation with the utility grid.

Microprocessor controller 90 provides loading of the generators and precise output control, for example kw/var output control, to provide optimal control over the power module 10 based on preset values. For instance, the controller 90 may determine individual generator power factor control. Further, the loading and output control may be fully programmable to allow remote access. In this particular embodiment, a remote access terminal can automatically curtail less important building loads in the event of a generator's failure during the loss of utility power. For example, if the failure rate of the individual generators 26 is about 2%, then the reliability of the power module assembly 10 to important loads is about 99.96%, without the cost of adding redundant generators.

Further, in the event of a utility source failure, the controller 90 can create a precise output response. For example, the programmable controller 90 determines an exact outage condition and provide a response load. In particular embodiments, the programmed controller 90 may provide full control of generator 26 time delays and a return period for returning to utility power at the completion of an outage. The return period may be either a closed transition or an open transition. In the event of a closed transition return, the controller 90 can provide a soft generator unloading.

Typically, controller 90 includes programmable flex logic to allow programmable logic control. This provides an opportunity to control ancillary equipment, both related, and not related, to the power module 10. For example, the programmable flex logic may adjust site load to generator capacity in a backup mode, particularly if an individual generator 26 were to fail or if site load increases above the generator's 26 capacity. The controller 90 may also include an external digital/analog input output card to further enhance the control of the assembly. Based on this disclosure, one of ordinary skill in the art will be able to program the microprocessor controller 90 to yield these functions.

Figure 7B:
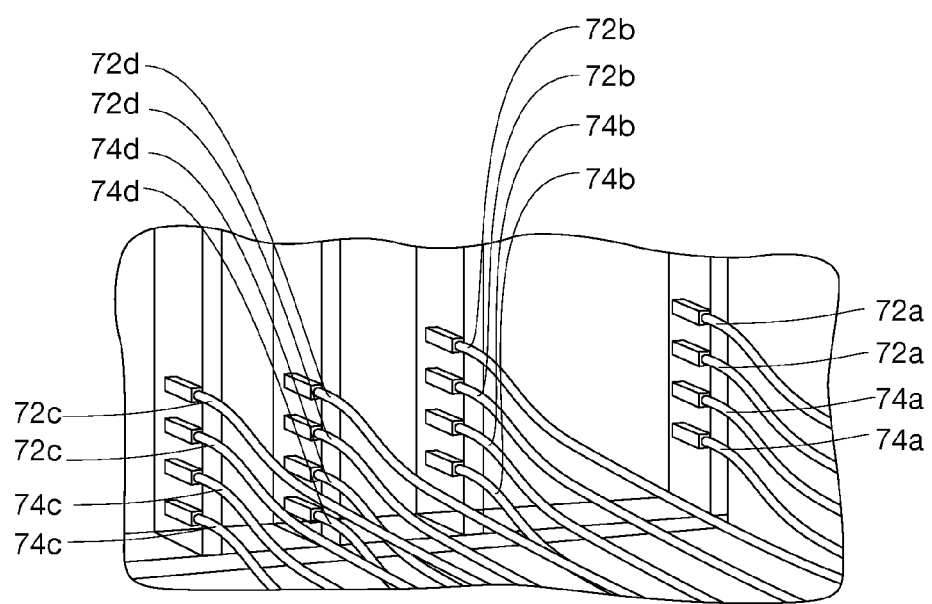

FIG. 7b shows components of the switchgear 71 housed in the switchgear module 70. As shown, two phase conductors 72 and two neutral conductors 74 connect each generator module, e.g. the end generator module 11a and the interior generator module 11b, with the switchgear 71. At the switchgear 71, the conductors 72, 74 are terminated on the line side of the breaker, i.e. typically at the upper bus with CTSs mounted on the bus. The conductors 72, 74 may be secured to the switchgear 71 using hardware, such as ⅜" hardware, and the terminations may be torqued at 18-22 foot-pounds. As illustrated, the two phase conductors 72 and the two neutral conductors 74 connect each generator module to switchgear 71, i.e. a pair of phase conductors 72a and a pair of neutral conductors 74a are used to connect one generator module to the switchgear 71, while a second pair of phase conductors 72b and pair of neutral conductors 74b are used to connect the second generator module to the switchgear 71, etc.

At the generator module, each of the phase conductors 72 and the neutral conductors 74 are terminated to the load side of the generator module breaker, i.e. typically the lower bus with termination plates. Each conductor 72, 74 may be secured to the generator, i.e. at a generator module breaker, using hardware, such as ⁄1;2" hardware, and the terminations may be torqued at 47-52 foot-pounds.

The power module 10 is a combination of switchgear 71 and generator modules to provide multiple generation options. Conventionally, data centers are prone to use an N+1 design (i.e. the required generation plus one identical generator) which adds an unnecessary large generator. For example, a 4 MW site would often have three 2 MW generators. Instead, the present disclosure allows a user to operate two 2.4 MW power modules 10. In this particular embodiment, if one 600 kW generator 26 suffers from a failure event, there remains 4.2 MW of power generation.

Similarly, running multiple smaller generators 26 will often produce less NOx in comparison to larger engines. For example, Tier 4 requirements (federally mandated emission controls) require that a 1.2 MW generator produce less than 3.5 g/kW-hr of NOx). In this instance, two 600 kW generators paralleled together will only be required to emit less than 0.4 g/kW-hr. Therefore, one embodiment of power module 10 using paralleled smaller generators may not need the addition of a Selective Catalytic Reduction (SCR) system, or in some cases, smaller SCR's can be used as compared to the needs of a single larger engine. In other embodiments, oversized generators 26 are installed in generator modules. In these embodiments, the use of oversized generators 26 in the power module 10 further reduce emission per kWh of generator output.

Additionally, the power modules 11 reduce the amount of fuel required than as compared to redundant generator systems. As an illustration only, if a building requires 2.4 mW of energy during a high load period, but only 1.6 MW during a lower load period, the controller 90 will automatically shut down one generator 26 during the low load period. In turn, the reduced number of active generators 26, i.e. three generators 26 as compared to four, allows the active generators 26 to run at their optimum performance rating point to reduce fuel consumption.

Figure 3A:
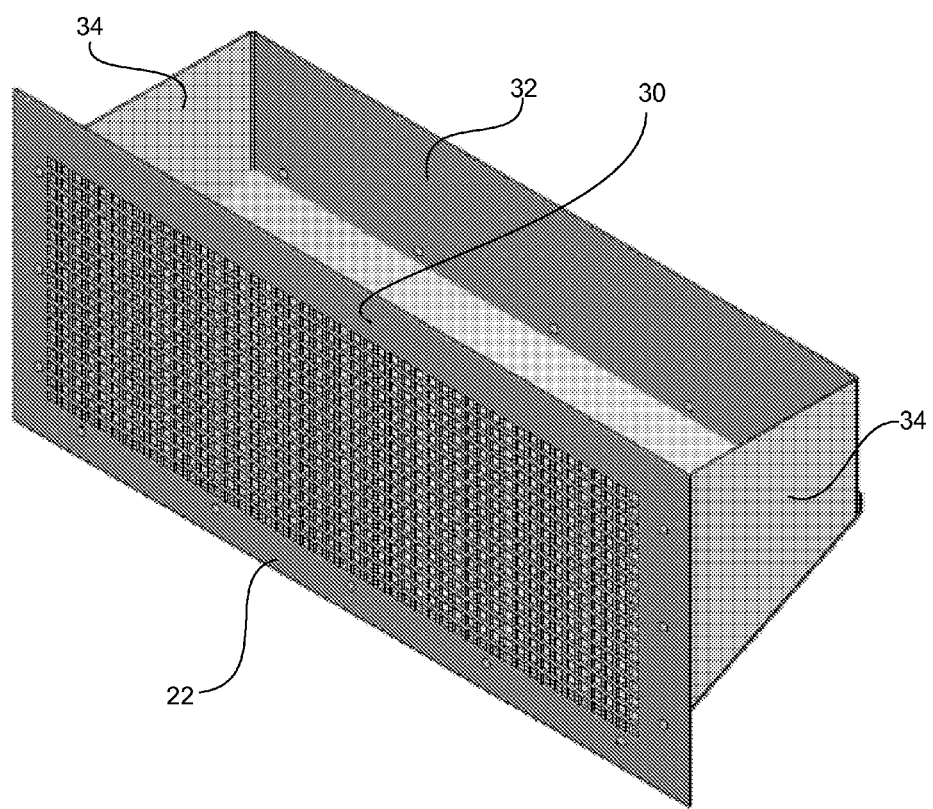
FIG. 3a is a front perspective view of a drawer air intake louver useful in embodiments of the invention.

FIGS. 1a, 3a, 3b, 3c, 4a, 4b and 4c show a plurality of drawer air intake louvers 22 inserted in the front side of enclosure 18. In other embodiments, the drawer air intake louvers 22 are inserted in other faces of enclosure 18. Air flow is induced by fans 38 mounted on the generator engines, as seen in FIG. 2. As best seen in FIG. 1a, the enclosure 18 typically includes a plurality of series of drawer air intake louvers 22, however other embodiments include a variety of arrangements of air intakes. As shown in FIG. 3a, drawer air intake louvers 22 includes a front grid member 30, a back member 32, and at least one, but often including two or more, side members 34. Typically, air is drawn through the grid 30 of the drawer louvers and forced up and over sides 34 and back 32 of the drawer air intake louvers 22 as air moves into the enclosure 18. In this particular embodiment, sound is typically attenuated by traveling up and over the back and sides of drawer air intake louvers 22 before exiting the enclosure 18. In another embodiment, an additional upside-down series of drawer air intake louvers is inserted on the outside of the enclosure 18 to mate with the inside drawer air intake louvers 22, particularly when more sound attenuation is beneficial.

Figure 3B:
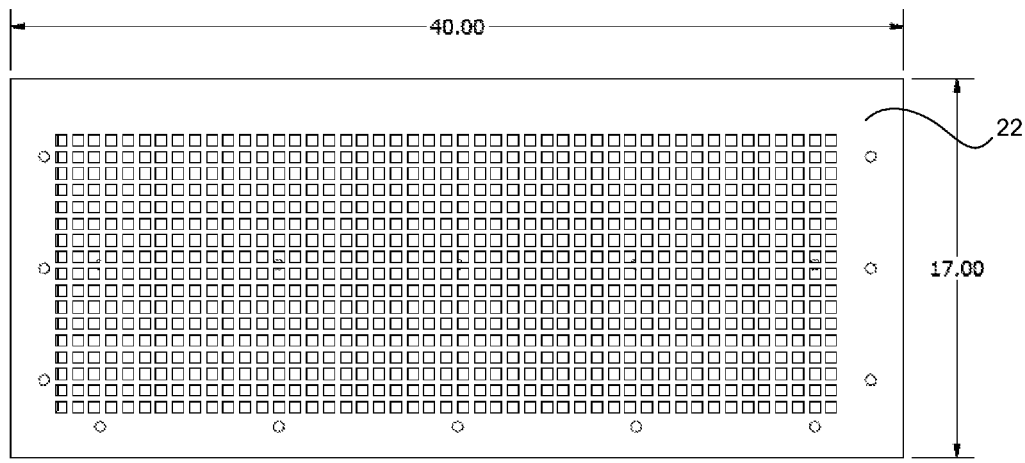
FIG. 3b is a front elevation view of an embodiment of the drawer air intake louver.
Figure 3C:
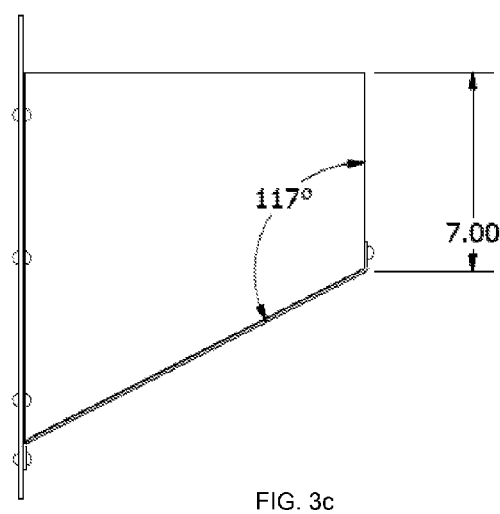
FIG. 3c is a side elevation view of an embodiment of the drawer air intake louver.
Figure 4A:
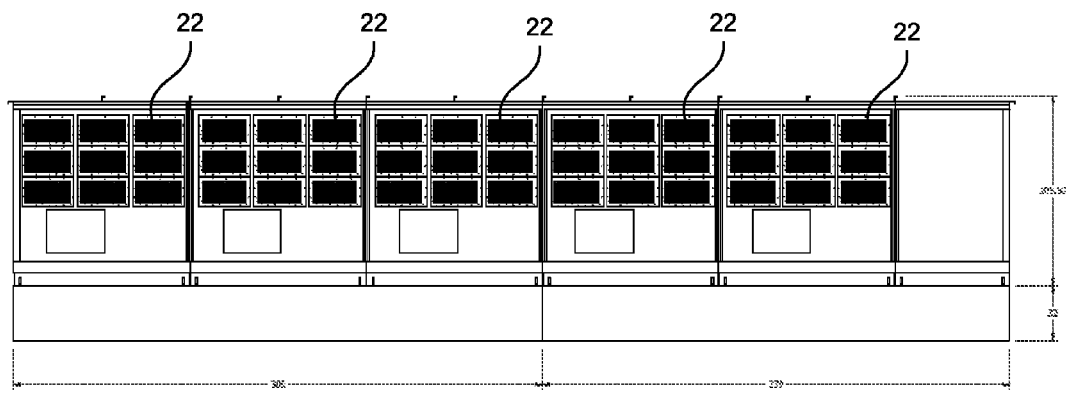
Figure 4B:
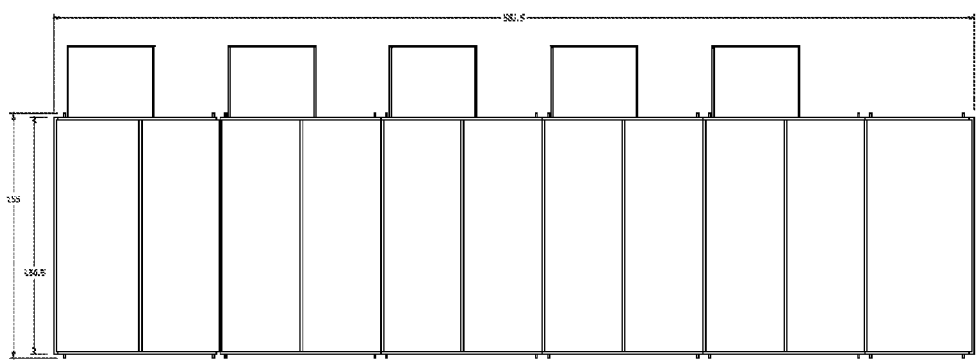
Figure 4C:
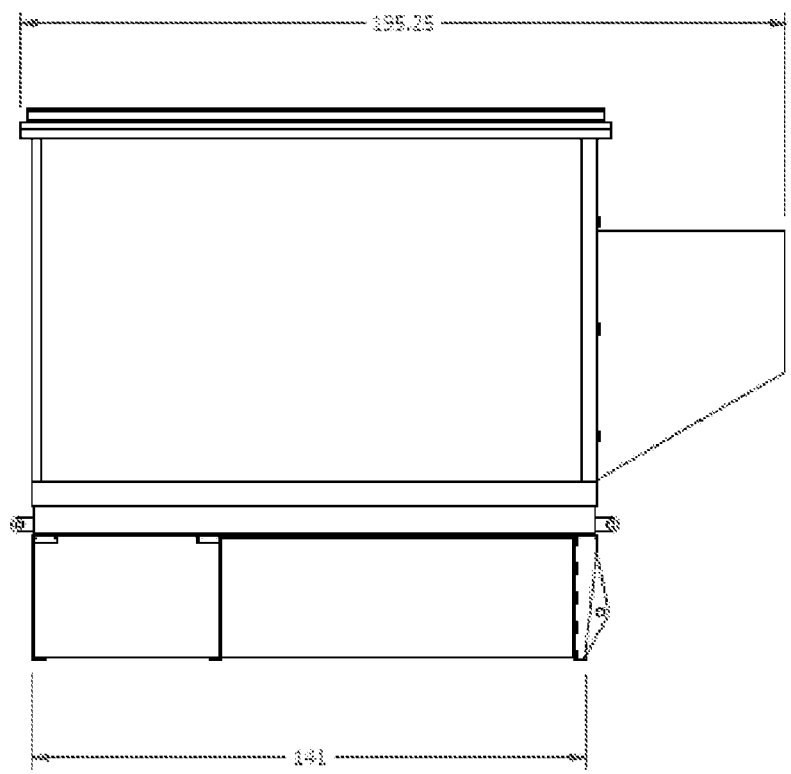

Further, sound attenuating material may be located in the drawer air intake louvers 22 for enhanced sound attenuation. Finally, drawer air intake louvers 22 may be inserted, or otherwise added, to enclosure 18 after a power module 10 is installed. For example, surrounding elevation or buildings may create unexpected pockets of air that retard fresh air circulation outside the generators 26, causing the outside air to exceed the generator's ambient air design temperature specifications. In theses cases, more drawer air intake louvers 22 may be added in the field, without substantially interfering with the enclosure's 18 structural stability. As shown in FIG. 3b, one embodiment of the grid face 30 drawer air intake louver 22 may be forty inches by seventeen inches.

In yet another embodiment of the disclosure, a method for operating a power module 10, e.g. including any of the embodiments previously shown or described, includes operating a block of enclosed generators 26 for generating a power load demand. The method includes activating a block of generators 12 and controlling a controller 90 to selectively activate or deactivate the generators 26 according to demand. Typically, controlling the microprocessor 90 includes individually operating a generator 26 in the block of generators 12 in response to a power load demand.

In another embodiment, the method includes synchronizing the block of generators together as a unit. The method may also include synchronizing the block of generators 12 to the utility grid. In particular embodiments, the controller 90 may be used to individually bypass a generator 26 in the block of generators 12 in response to a power load demand.

Numerous characteristics and advantages have been set for in the foregoing description. Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A power module comprising:
   a base enclosing a fuel tank and having fuel tank fittings;
   an end generator module having a generator and a top, side and end panel configured to form at least a partial enclosure around the generator and to be affixed to the base in communication with the fuel tank fittings;
   an interior generator module having a generator and a top and a side panel configured to form at least a partial enclosure around the generator and to be ganged to the end generator module and affixed to the base in communication with the fuel tank fittings; and
   a switchgear module configured to be affixed to the base and ganged to at least one of the generator modules, the switchgear module including a control system in communication with each of the generator modules to coordinate the generators as a unit and to control the loading of each of the generators in response to a power load demand,
       wherein the end generator module, the interior generator module and the switchgear module are affixed on the base to form a substantially modular enclosure, and
       whereby at a subsequent time an additional generator module can be ganged to the modular enclosure and affixed to the base.

2. The power module in claim 1, wherein the base includes a cable tray.

3. The power module in claim 1, including a single catalytic converter, wherein the generators exhaust to the single catalytic converter.

4. The power module in claim 1, wherein at least one of the generator modules includes a series of drawer air intake louvers mounted to at least one panel.

5. The power module in claim 1, wherein a phase conductor and a neutral conductor electrically connect the switchgear module and each generator module.

6. The power module in claim 1, wherein the control system includes a microprocessor to coordinate the generators in parallel to a utility grid.

7. The power module in claim 1, wherein in a generator failure event of one of the generators, the control system provides a continuous power output from the remaining generators.

8. The power module in claim 1, wherein when one of the generators is bypassed the control system provides a continuous power output from the remaining generators.

9. The power module in claim 1, wherein the control system synchronizes the generators to provide power within 60 seconds.

10. The power module in claim 1, wherein the control system furnishes volt-amperes reactives (VARs) into the utility grid when a grid node reaches a voltage sag level.

11. The power module in claim 1, wherein the end generator module includes an end bottom and the interior generator module includes an interior bottom, whereby the end bottom and the interior bottom are configured to be spaced snuggly together and fastened to the base.

12. The power module in claim 1, whereby at a subsequent time at least one of the generator modules can be removed from the modular enclosure.

13. A power module comprising:
   a base enclosing a fuel tank and having fuel tank fittings;
   an end generator module having a generator and a top, side and end panel configured to form at least a partial enclosure around the generator and to be affixed to the base in communication with the fuel tank fittings;

an interior generator module having a generator and a top and a side panel configured to form at least a partial enclosure around the generator and to be ganged to the end generator module and affixed to the base in communication with the fuel tank fittings; and a switchgear module configured to be affixed to the base and ganged to at least one of the generator modules, wherein the end generator module, the interior generator module and the switchgear module are affixed on the base to form a substantially modular enclosure, and wherein at least one of the generator modules includes a series of drawer air intake louvers mounted to at least one panel to move air into the module.

14. The power module in claim 13, wherein the end generator module includes an end module framing and the interior generator module includes an interior module framing.

15. The power module in claim 14, wherein the end module framing and the interior module framing are configured to align adjacent to one another on the base.

16. The power module in claim 15, including a framing fastener to fasten together the end generator module and the interior generator module.

17. The power module in claim 13, wherein the end generator module includes a bolted end plate.

18. The power module in claim 13, wherein at least one of the generator modules includes a discharge plenum.

19. The power module in claim 13, wherein the switchgear module includes a control system in communication with each of the generator modules to coordinate the generators as a unit.

20. A power module comprising:
a base;
an end generator module;
an interior generator module configured to be ganged to the end generator module; and
a switchgear module in communication with each of the generator modules,
wherein the end generator module, the interior generator module and the switchgear module are configured to be positioned on the base to form a substantially modular enclosure.

* * * * *

UNITED STATES PATENT AND TRADEMARK OFFICE
CERTIFICATE OF CORRECTION

PATENT NO. : 8,427,005 B1  
APPLICATION NO. : 12/855863  
DATED : April 23, 2013  
INVENTOR(S) : Kisner et al.

Page 1 of 1

It is certified that error appears in the above-identified patent and that said Letters Patent is hereby corrected as shown below:

In the Specifications

In Column 4, Line 61, releasablly should be "releasably"

In Column 6, Line 63, the internet address should read: "cia.org/pg/j1939/about_j1939"

In Column 3, Line 41, 1;2 should be "1/2"

In Column 9, Line 63, the word after set should be "forth"

Signed and Sealed this
Sixteenth Day of July, 2013

Teresa Stanek Rea
*Acting Director of the United States Patent and Trademark Office*